United States Patent [19]
Hardison et al.

[11] 4,007,804
[45] Feb. 15, 1977

[54] APPARATUS FOR REMOVAL OF CONDENSATION FROM A MARINE GAS EXPLODER DEVICE

[75] Inventors: Jack E. Hardison, Garland; Alpheus A. Franklin, Dallas, both of Tex.

[73] Assignee: Atlantic Richfield Company, Los Angeles, Calif.

[22] Filed: Oct. 6, 1975

[21] Appl. No.: 619,926

[52] U.S. Cl. .................... 181/118; 181/110; 181/116; 29/594

[51] Int. Cl.² .............. G01V 1/02; G01V 1/10; G01V 1/38

[58] Field of Search .......... 181/110, 116, 118, 120, 181/142; 29/594; 60/632, 634; 340/8 FT, 12 SD, 17

[56] References Cited
UNITED STATES PATENTS

| | | | |
|---|---|---|---|
| 3,380,551 | 4/1968 | Lang | 340/7 R |
| 3,478,838 | 11/1969 | Kilmer | 340/17 |
| 3,509,962 | 5/1970 | Barnett | 181/118 |
| 3,545,563 | 12/1970 | Cholet | 181/118 |
| 3,563,334 | 2/1971 | McCarter | 181/118 |
| 3,919,684 | 11/1975 | Reed | 181/118 |

*Primary Examiner*—Nelson Moskowitz
*Attorney, Agent, or Firm*—Robert M. Betz

[57] ABSTRACT

Condensate accumulating in the combustion chamber of a marine gas exploder of the cylinder and piston type is collected by gravity flow in a sump formed in a cylinder side wall or in a face of the piston, depending upon whether the cylinder is oriented horizontally or vertically. One end of an exhaust tube is positioned adjacent the base of the sump so that gaseous combustion products flow through the sump into the exhaust tube so as to collect and remove the accumulated condensate.

7 Claims, 6 Drawing Figures

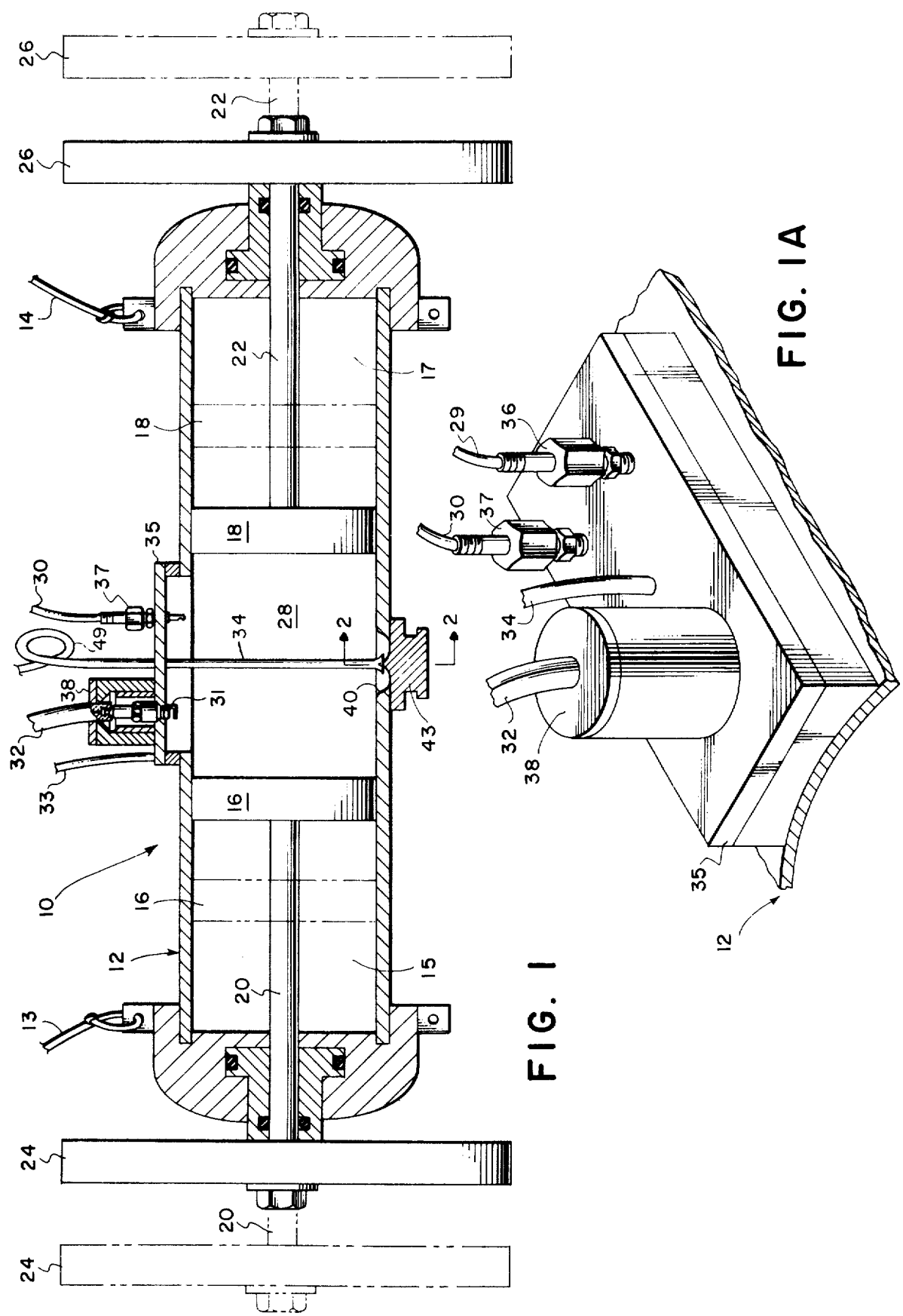

4,007,804

APPARATUS FOR REMOVAL OF CONDENSATION FROM A MARINE GAS EXPLODER DEVICE

BACKGROUND OF THE INVENTION

1. Field of the Invention

This invention relates generally to the construction and operation of acoustic signal generators, especially of the marine gas exploder type wherein a gas explosion confined in an expansible chamber acts to create an acoustic pulse by moving a mass through the water. Specifically, the invention relates to a means and a method for expelling gas and liquid combustion products from such a combustion chamber in a single step.

2. Description of the Prior Art

Acoustic signal sources such as underwater seismic gas exploders are typically operated by ignition of an explosive gas mixture confined within a combustion chamber separating two relatively movable rigid bodies. Movement of at least one of these bodies is adapted to propel a mass through the water at a rate sufficient to generate an acoustic signal.

In prior art apparatus of this character, oxygen and propane are introduced into the combustion chamber of an underwater cylinder under suitable pressure and there ignited with a conventional spark plug. The resultant combustion products are expelled through an exhaust tube communicating with the chamber.

It is recognized that there will always be some residual condensation present in such a combustion chamber. The main reason for this is that water is one byproduct of the chemical reaction of oxygen and propane. Since the underwater environment is being constantly cooled, some of this water, initially in the form of steam, condenses along the walls of the cylinder after each firing. This condensation causes a pressure drop within the chamber; and if the exhaust line is vented to the atmosphere, outside air will be sucked in to equalize the differential pressure. This introduces a further source of water vapor and condensate. If not removed from the combustion chamber, all such condensate will accumulate and may splash against the spark plug causing it to misfire and eventually occupy sufficient space to significantly reduce the force of succeeding explosions.

One prior art technique for extracting such condensate is illustrated in U.S. Pat. No. 3,509,962. In this patent, liquid products of combustion within a seismic marine gas exploder are gathered at the lower inclined end of a combustion chamber and thereafter passed through a siphon which feeds into the flow of exhaust gases in an exhaust line. Ejection of condensed liquids in this manner occurs only during the maximum pressure phase of the combustion, and it appears that continuous vacuum must be applied to the exhaust line in order to suck out the atomized liquid.

It is therefore a general object of this invention to provide an apparatus for removal of condensate from the combustion chamber of a marine gas exploder.

It is a more specific object of this invention to provide an apparatus of the character described in which such condensate is removed automatically responsive to the flow of gaseous combustions products from said chamber.

It is a still further object of this invention to provide an apparatus of the character described in which such condensate may be removed automatically at any of several phases of the operation of such apparatus.

SUMMARY OF THE INVENTION

In a preferred embodiment of this invention, a marine gas exploder is supported in a completely submerged state. The exploder consists essentially of an outer enclosed cylinder with its axis extending horizontally, a pair of movable pistons within the cylinder separated by an expansible combustion chamber, a pair of piston rods extending from said pistons through the respective opposite ends of the cylinder to interconnect with a pair of external plates whose movement through the water produces an acoustic signal, means for introducing and igniting a pressurized explosive gas mixture within the combustion chamber to drive the pistons apart against air spring means, and means for expelling combustion products from the combustion chamber. A portion of the cylinder wall forming the bottom of the combustion chamber is formed into a sump for collection of condensate periodically produced within the chamber. An exhaust tube is introduced into the combustion chamber through the top of the cylinder wall so that it projects downwardly into the combustion chamber and into the sump. A central upwardly projecting cone is formed in the sump extending within the lower end of the exhaust tube. When gaseous combustion products are forced through the sump into the exhaust tube, the condensate in the sump is entrained in the resultant gas flow and removed at the same time.

In an alternate embodiment of this invention, a stationary enclosed cylinder, supported so that its axis is vertical, includes a combustion chamber above a movable piston. The piston is driven in a downward direction by the expansion of an explosive gas mixture within the chamber to move an external plate through the water. A sump for collection of liquid combustion products is formed in a face of the piston communicating with the combustion chamber, and an exhaust tube for removing combustion gases is introduced through the top of the cylinder so that its lower end extends within the sump. A mixture of gaseous and liquid combustion products are forced upwardly into the exhaust tube and thereby removed.

DESCRIPTION OF THE DRAWINGS

FIG. 1 is a view in longitudinal section of an improved marine gas exploder in accordance with this invention. FIG. 1a is an isometric view of a combined full injection and ignition installation for the marine gas exploder of FIG. 1.

DESCRIPTION OF THE PREFERRED EMBODIMENTS

Figure 3:
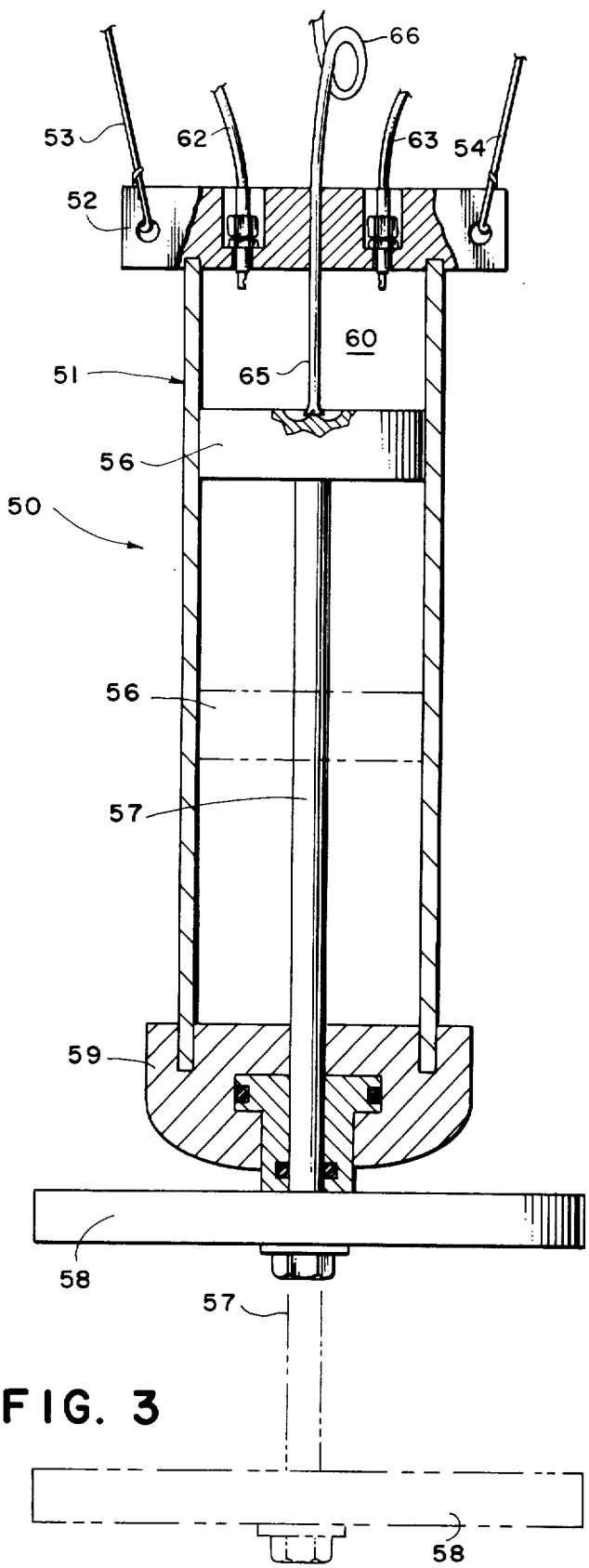
FIG. 3 is a view in longitudinal section of an improved marine gas exploder in accordance with an alternate embodiment of this invention.

Referring now to FIGS. 1 and 1a, a marine gas exploder 10 includes an outer enclosed cylinder 12 supported at opposite ends by suitable cables 13 and 14 from a stationary or movable support (not shown) such as a float. A pair of similar pistons 16 and 18 are adapted to move in opposite directions within the cylinder 12. Pistons 16 and 18 are connected respectively by pistons rods 20 and 22 to external plates 24 and 26. The space between the pistons 16 and 18 within the cylinder 12 forms a combustion chamber 28 which may be charged with an explosive gas mixture under suitable pressure to drive the pistons 16 and 18 in opposite directions. This explosive gas mixture may consist, for example, of separate streams of oxygen and propane introduced through tubes 29 and 30 respectively. Ignition of such mixture is accomplished by means of a conventional spark plug 31 connected to a source of voltage through insulated cables 32 and 33. An exhaust tube 34, which may be either of the closed or open type, extends into the chamber 28 to enable the expulsion or purging of gaseous combustions products. As best seen in FIG. 1a, a mounting plate 35, positioned over an aperture in the upper wall of the cylinder 12, supports a pair of gas tube holders 36 and 37, through which tubes 29 and 30 communicate respectively with the interior of chamber 28. Spark plug 31 is in like manner retained in a holder 38 secured to mounting plate 35. The details of the combined fuel injection and spark plug installation for gas exploder 10 constitutes a separate invention covered in commonly assigned co-pending application Ser. No. 619,928 entitled METHOD AND APPARATUS FOR PREVENTING MISFIRES IN A MARINE GAS EXPLODER, filed in the names of Alpheus A. Franklin and Jack E. Hardison.

In operation, expansion of the exploding gases within the chamber 28 drives the pistons 16 and 18 oppositely against the counter pressure of the air boxes 15 and 17 to accelerate the plates 24 and 26 through the water at the rate sufficient to generate cavitation bubbles behind such plates. Collapse of such cavitation bubbles with approximate simultaneity produces an acoustic signal of desired magnitude which may be used for seismic or other purposes. Apparatus of this character forms the subject of a separate invention described in more detail in commonly assigned co-pending application Ser. No. 619,927, entitled Marine Gas Exploder, filed in the names of Dale H. Reed and Jack E. Hardison.

Figure 2:
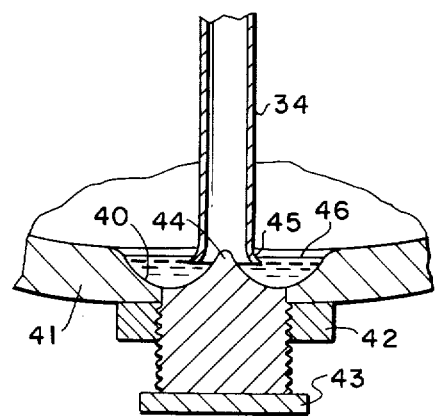
FIG. 2 is a detailed cross-sectional view of a sump and exhaust tube combination in accordance with this invention taken along the line 2—2 in FIG. 1.

Turning now to the features with which the present invention is more particularly concerned, attention is directed to the detail of FIG. 2. At the bottom of the combustion chamber 28, a sump 40 is formed within the wall 41 of the cylinder 12. The sump 40 is preferably machined so that it has a generally circular configuration of any desired dimensions having a depth approximating that of the thickness of the wall 41, although the precise shape is not critical. A nut 42 may be welded to the external surface of the cylinder 12 adjacent the sump 40 and threaded to receive a tapered pipe plug 43 to form a seal against water leakage into the chamber 28. The mounting plate 35 secured to the upper portion of the wall 41 receives and supports the exhaust tube 34 to enable it to extend downwardly through the chamber 28 and into the sump 40. The upper end of the plug 43 may be machined to form a cone 44 projecting into the open lower end of the exhaust tube 34 to increase the flow velocity of liquid and gaseous combustion products. In order to enhance the venturi effect, the bottom of the exhaust tube 34 may be provided with a flared lip 45 extending adjacent the bottom of the sump 40. In an operating prototype, a vertical clearance of approximately one-eighth of an inch is established between the lip 45 and the sump 40.

In operation, liquid 46 will collect by gravity flow within the sump 40. Owing to the relative positions of the lip 45 and the sump 40, any gaseous combustion products flowing into the exhaust tube 34 must pass through the sump 40. If the level of the liquid 44 lies above the lip 45, the flow of gas will tend intially to sweep out the liquid ahead of such flow into the exhaust tube 34 in relatively large drops. If this liquid level is below the lip 45, there is a greater likelihood that the liquid 44 will be atomized and entrained in the gas prior to entering the exhaust tube 34. In either event, the exhaust tube 34 carries off a mixture of gaseous and liquid combustion products from the chamber 28. A conventional trap 49 formed in the exhaust tube 34 prevents re-entry of liquids removed in this manner.

In accordance with this invention, this gas and liquid mixture may be ejected by the force of the explosion in chamber 28 or partially squeezed out by the return of the pistons 16 and 18 to their original positions under the counterpressure of air springs 15 and 17. Filling of the combustion chamber 28 with fresh gases also pushes out such mixture. If desired, separate purging means (not shown) well-known in the art may be introduced within the chamber 28 for the same purpose. Finally, the exhaust tube 34 may be provided with external vacuum means (not shown) of conventional construction to suck out the contents of the chamber 28. Thus, the removal of collected condensate automatically accompanies the outflow of gaseous combustion products, regardless of the phase of operation of gas exploder 10 at which such outflow occurs.

In the alternate embodiment of FIG. 3, there is shown a marine gas exploder 50 in accordance with this invention consisting generally of an outer vertically oriented cylinder 51, supported from its upper end plate 52 by means of cables 53 and 54, suspended from any convenient support device (not shown) either stationary or movable. The piston 56 is interconnected by means of a rod 57 with an external plate 58 adjacent the lower end cap 59 of the cylinder 51. The space within the cylinder 51 above the piston 56 forms a combustion chamber 60. Separate streams of propane and oxygen may be introduced within the combustion chamber 60 through the flexible fill lines 62 and 63 and ignited by means of a convention spark plug (not shown). In order to vent, purge or otherwise expel spent combusted gas from the chamber 60, an exhaust tube 65 provided with a liquid trap 66 is introduced downwardly through the end plate 52 and through the chamber 60.

Figure 4:
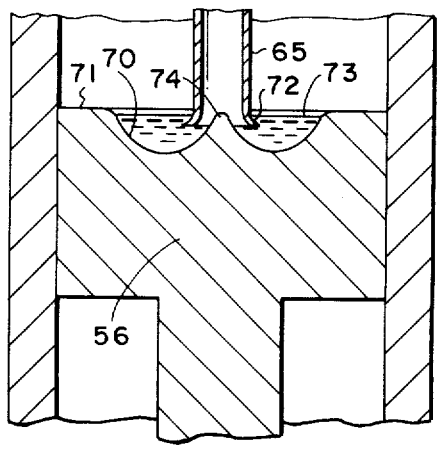
FIG. 4 is an enlarged detail of the piston and exhaust tube shown in FIG. 3.

The detail of FIG. 4 shows the construction of the piston 56 in greater detail. The outwardly flared lower lip 72 of the exhaust tube 65 is brought into close proximity with the base of the sump 70. An upwardly projecting cone 74 formed in the base 71 is positioned centrally within the sump 70 so that it projects within the end of the exhaust tube 65.

The operation of the apparatus of this invention as in the alternate embodiment of exploder 50 is substantially similar to that previously described. Gravity flow will cause condensate 73 formed within the chamber 60 to collect within the sump 70 where it may be flushed out by the flow of spent combustion gas into the exhaust tube 65 by any of the various mechanisms described above. As before, the flared shape of the lower lip 72 together with the upwardly projecting cone 74 facilitate the flow of the mixture of gaseous and liquid combustion products.

Figure 5:
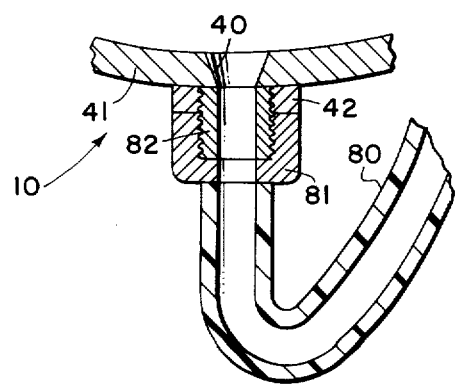
FIG. 5 is an enlarged detail of an alternate form of the sump and exhaust tube combination shown in FIG. 2.

Within the scope of this invention, it will be possible to provide a further alternate embodiment thereof as shown in FIG. 5. The exhaust tube 34 in the exploder 10 of FIG. 1 is replaced by a flexible exhaust tube 80 which is adapted to extend downwardly from a supporting float (not shown) so that it reaches the under surface of the exploder 10. The lower end of the tube 80 terminates in a swivel nozzle 81 which treads onto the tapered fitting 82 which is bored to provide direct communication with the base of the sump 40. In operation, condensate collecting in the sump 40 drains directly into the exhaust tube 80. Entrainment of condensate in the flow of gaseous combustion products occurs by any of the various mechanisms previously described to enable the combined ejectment of gas and liquid products from the combustion chamber 28.

It should be understood that the greatest need for condensate removal in gas exploders is in a marine environment because of the cooling effect of the water. However, the structure and mode of operation of the apparatus described is compatible with a land-operated device if that should be deemed necessary or desirable.

The foregoing description and drawings are to be regarded as illustrative only, and those skilled in the art will have no difficulty in suggesting further structural modifications within the scope of this invention as more particularly set out in the appended claims.

We claim:

1. In a marine gas exploder having a combustion chamber formed within a vertically extending enclosed cylinder above a movable piston, said combustion chamber being charged with an explosive gas mixture adapted on ignition to produce gaseous and liquid combustion products, the improvement comprising:
   a. a sump formed within a face of said piston communicating with said combustion chamber and adapted to collect said liquid combustion products therein by gravity flow and
   b. an exhaust tube introduced within said combustion chamber, the lower end of said exhaust tube extending into said sump so that said gaseous combustion products flow through said sump into said lower end and said liquid combustion products are entrained therewith.

2. The apparatus claimed in claim 1 wherein said exhaust tube is introduced downwardly through the upper end of said cylinder into said combustion chamber.

3. In a gas exploder including an enclosed cylinder adapted to be submerged in water and extending in a generally horizontal direction, said cylinder having formed therein an expansible combustion chamber charged with an explosive mixture adapted on ignition to produce gaseous and liquid combustion products, the improvement comprising:
   a. a sump formed in the sidewall of said cylinder at the bottom of said combustion chamber and adapted to collect said liquid combustion products therein by gravity flow, and
   b. an exhaust tube extending downwardly through said cylinder sidewall into said combustion chamber so that the open lower end of said exhaust tube is positioned adjacent the bottom of said sump, so that gaseous combustion products flowing into said exhaust tube pass through said sump and are thereby adapted to carry said liquid combustion products into said exhaust tube for removal thereof.

4. The apparatus claimed in claim 3 wherein said lower end of said tube is outwardly flared.

5. The apparatus claimed in claim 4 wherein the central portion of said sump is formed into a cone projecting upwardly into said lower end of said tube.

6. The apparatus claimed in claim 5 wherein said cone forms one end of a plug threadably secured to said cylinder sidewall.

7. In a gas exploder including an enclosed cylinder adapted to be submerged in water and extending in a generally horizontal direction, said cylinder having formed therein an expansible combustion chamber charged with an explosive mixture adapted on ignition to produce gaseous and liquid combustion products, the improvement comprising:
   a. a sump formed in the sidewall of said cylinder at the bottom of said combustion chamber and adapted to collect said liquid combustion products therein by gravity flow, and
   b. an exhaust tube extending through said cylinder sidewall into communication with said sump, said tube being oriented to enable said liquid combustion products to drain directly from said sump into said tube, and so that said gaseous combustion products flowing into said exhaust tube pass through said sump and are thereby adapted to carry said liquid combustion products into said exhaust tube for removal thereof.

* * * * *